(12) United States Patent
Ewing

(10) Patent No.: US 11,969,674 B2
(45) Date of Patent: Apr. 30, 2024

(54) LIQUID FILTERING BAG

(71) Applicant: Todd Ewing, Walnut Creek, CA (US)

(72) Inventor: Todd Ewing, Walnut Creek, CA (US)

( * ) Notice: Subject to any disclaimer, the term of this patent is extended or adjusted under 35 U.S.C. 154(b) by 0 days.

(21) Appl. No.: 17/832,501

(22) Filed: Jun. 3, 2022

(65) Prior Publication Data

US 2023/0390674 A1 Dec. 7, 2023

(51) Int. Cl.
*B01D 29/27* (2006.01)
*B01D 29/09* (2006.01)
*B01D 29/62* (2006.01)

(52) U.S. Cl.
CPC ........... *B01D 29/27* (2013.01); *B01D 29/093* (2013.01); *B01D 29/62* (2013.01)

(58) Field of Classification Search
None
See application file for complete search history.

(56) References Cited

U.S. PATENT DOCUMENTS

| | | | | |
|---|---|---|---|---|
| 150,525 A * | 5/1874 | Carpenter | ............. | B01D 29/111 210/460 |
| 217,906 A * | 7/1879 | Shaler | ................... | B01D 29/111 210/460 |
| 621,937 A * | 3/1899 | Niemann | .............. | B01D 29/111 285/242 |
| 1,028,114 A * | 6/1912 | Holton | ..................... | A47J 43/22 210/474 |
| 1,199,628 A * | 9/1916 | Stauffer | ................ | B01D 29/111 137/544 |
| 1,284,944 A * | 11/1918 | Pierre | .................... | B01D 35/02 4/291 |
| 1,767,523 A * | 6/1930 | Frankenhoff | .......... | B01D 29/39 210/232 |
| 2,008,919 A * | 7/1935 | Milkes | ................... | A41B 13/06 5/413 R |
| 2,286,434 A * | 6/1942 | Myers | ..................... | B01D 29/90 210/489 |
| 2,378,434 A * | 6/1945 | Bestor | .................... | A47G 9/086 5/413 R |
| 2,416,524 A * | 2/1947 | Huse | ....................... | B01D 39/18 210/489 |
| 2,431,603 A * | 11/1947 | Zito | ........................ | A41B 13/06 5/413 R |
| 2,572,490 A * | 10/1951 | Kaplan | .................. | A47G 9/086 5/413 R |
| 2,588,536 A * | 3/1952 | Kaplan | .................. | A47G 9/086 5/413 R |
| 2,594,438 A * | 4/1952 | Howe | .................... | A47G 9/086 5/413 R |
| 2,637,048 A * | 5/1953 | Peters | ................... | A47G 9/086 5/413 R |

(Continued)

OTHER PUBLICATIONS

Final Office Action, dated Feb. 6, 2023, for U.S. Appl. No. 17/832,501, filed Jun. 3, 2022, 16 pages.

(Continued)

*Primary Examiner* — Robert J Popovics
(74) *Attorney, Agent, or Firm* — Vedder Price P.C.

(57) ABSTRACT

A liquid filtering bag comprises a liquid-permeable fabric and zipper. When the zipper is fully engaged, the fabric folds to form a liquid filtering bag suitable for filtering liquids. When the zipper is fully disengaged, the fabric unfolds to form a flat sheet suitable for thorough washing.

4 Claims, 4 Drawing Sheets

(56) References Cited

U.S. PATENT DOCUMENTS

| | | | | |
|---|---|---|---|---|
| 2,644,948 A * | 7/1953 | Gutmann | | A47G 9/086 |
| | | | | 5/413 R |
| 2,693,246 A * | 11/1954 | Marcheck | | B01D 46/06 |
| | | | | 55/482 |
| 2,702,385 A * | 2/1955 | Goldberg | | A41B 13/06 |
| | | | | 5/413 R |
| 2,711,546 A * | 6/1955 | Licht | | A47G 9/086 |
| | | | | 5/413 R |
| 2,757,390 A * | 8/1956 | Miller | | A47G 9/086 |
| | | | | 5/413 R |
| 2,784,473 A * | 3/1957 | Morin | | A44B 19/38 |
| | | | | 24/433 |
| 2,804,898 A * | 9/1957 | Cox | | D06F 95/006 |
| | | | | 383/102 |
| 2,888,009 A * | 5/1959 | Taylor | | A47G 9/083 |
| | | | | 5/413 R |
| 2,897,863 A * | 8/1959 | Somers, Jr. | | D06F 95/006 |
| | | | | 383/41 |
| 2,931,043 A * | 4/1960 | Achner | | A61F 7/02 |
| | | | | 5/413 R |
| 2,972,757 A * | 2/1961 | Janet | | A47G 9/086 |
| | | | | 5/413 R |
| 3,067,504 A * | 12/1962 | Lubben | | B01D 29/27 |
| | | | | 29/896.62 |
| 3,381,306 A * | 5/1968 | Innes | | A47G 9/086 |
| | | | | 5/413 R |
| 3,419,151 A * | 12/1968 | Wrotnowski | | B01D 29/27 |
| | | | | 210/489 |
| 3,526,323 A * | 9/1970 | Smith | | B01D 29/27 |
| | | | | 210/460 |
| 3,584,323 A * | 6/1971 | Worley | | A47G 9/086 |
| | | | | 5/413 R |
| 3,707,236 A * | 12/1972 | Takebayasi | | E03C 1/08 |
| | | | | 210/460 |
| 3,762,562 A * | 10/1973 | Okuniewski | | F16L 37/084 |
| | | | | 210/460 |
| 3,762,565 A * | 10/1973 | Okuniewski | | F16L 37/0925 |
| | | | | 210/460 |
| 3,774,249 A * | 11/1973 | Ybarra | | A47G 9/083 |
| | | | | 5/413 R |
| 3,780,868 A * | 12/1973 | Miles, II | | B01D 29/54 |
| | | | | 210/333.1 |
| 3,857,125 A * | 12/1974 | Hunt | | A47G 9/086 |
| | | | | 5/413 R |
| 3,878,574 A * | 4/1975 | Erickson | | A47G 9/086 |
| | | | | 5/413 R |
| 3,937,621 A * | 2/1976 | Gravley | | B01D 46/02 |
| | | | | 112/475.08 |
| 3,959,138 A * | 5/1976 | Nichols | | B01D 29/232 |
| | | | | 210/94 |
| 3,959,834 A * | 6/1976 | Hunt | | A47G 9/086 |
| | | | | 5/413 R |
| 3,966,121 A * | 6/1976 | Littman | | B05B 1/20 |
| | | | | 239/197 |
| 3,984,330 A * | 10/1976 | Nichols | | B01D 29/232 |
| | | | | 210/460 |
| 4,022,695 A * | 5/1977 | Howard | | B01D 29/39 |
| | | | | 55/369 |
| 4,035,304 A * | 7/1977 | Watanabe | | A61M 5/165 |
| | | | | 210/317 |
| 4,069,751 A * | 1/1978 | Gronwick | | A47J 31/02 |
| | | | | D7/310 |
| 4,122,008 A * | 10/1978 | Allen | | B01D 39/1623 |
| | | | | 210/197 |
| 4,238,871 A * | 12/1980 | Cannon | | A44B 19/36 |
| | | | | 5/413 R |
| 4,253,959 A * | 3/1981 | Tafara | | B01D 29/27 |
| | | | | 210/232 |
| 4,303,519 A * | 12/1981 | DelVecchio | | B01D 29/27 |
| | | | | 210/238 |
| 4,403,636 A * | 9/1983 | Lopez | | A45C 3/00 |
| | | | | 383/4 |
| 4,484,362 A * | 11/1984 | Asher | | A45F 3/22 |
| | | | | 5/413 R |
| 4,513,461 A * | 4/1985 | Tardivel | | A47G 9/086 |
| | | | | 5/413 R |
| 4,575,423 A * | 3/1986 | Alanis | | B01D 29/111 |
| | | | | 210/167.17 |
| 4,587,682 A * | 5/1986 | Schultz | | A47G 9/086 |
| | | | | 5/413 R |
| 4,618,420 A * | 10/1986 | Alanis | | E04H 4/1654 |
| | | | | 210/167.17 |
| 4,710,967 A * | 12/1987 | Petschner | | B65D 88/1681 |
| | | | | 383/114 |
| 4,739,529 A * | 4/1988 | Mills | | A47G 9/083 |
| | | | | 446/72 |
| 4,765,352 A * | 8/1988 | Strieter | | B08B 15/026 |
| | | | | 135/900 |
| 4,790,040 A * | 12/1988 | Grilliot | | A47G 9/086 |
| | | | | 5/413 R |
| 4,804,470 A * | 2/1989 | Calvillo | | B01D 29/27 |
| | | | | 210/474 |
| 4,811,767 A * | 3/1989 | Kessler | | E04H 1/1238 |
| | | | | 150/901 |
| 4,856,131 A * | 8/1989 | Mills | | A63H 3/003 |
| | | | | 446/72 |
| 4,880,531 A * | 11/1989 | Blake | | B01D 29/902 |
| | | | | 210/167.17 |
| 4,989,282 A * | 2/1991 | Goldstein | | A47G 9/083 |
| | | | | 5/413 R |
| 4,989,995 A * | 2/1991 | Rubenstein | | D06F 95/006 |
| | | | | 383/102 |
| 5,005,235 A * | 4/1991 | Huang | | A47G 9/086 |
| | | | | 5/413 R |
| 5,092,682 A * | 3/1992 | Fenick | | A45C 3/00 |
| | | | | 383/117 |
| 5,186,828 A * | 2/1993 | Mankin | | B01D 29/27 |
| | | | | 210/474 |
| 5,205,938 A * | 4/1993 | Fiumano | | B01D 46/02 |
| | | | | 210/453 |
| 5,217,610 A * | 6/1993 | McClain | | B03C 1/286 |
| | | | | 210/471 |
| 5,320,429 A * | 6/1994 | Toyosawa | | D06F 95/008 |
| | | | | 383/117 |
| 5,327,851 A * | 7/1994 | Pare | | A01K 1/0353 |
| | | | | 5/413 R |
| 5,368,728 A * | 11/1994 | Reaves | | B01D 29/27 |
| | | | | 210/474 |
| 5,406,966 A * | 4/1995 | Lepkowski | | E04D 13/08 |
| | | | | 210/162 |
| 5,473,779 A * | 12/1995 | Kramer | | A47G 9/086 |
| | | | | 5/413 R |
| 5,490,294 A * | 2/1996 | Kramer | | A47G 9/086 |
| | | | | 5/413 R |
| 5,533,216 A * | 7/1996 | Thier | | A47G 9/086 |
| | | | | 5/413 R |
| 5,565,097 A * | 10/1996 | Hayday | | B01D 29/23 |
| | | | | 68/18 F |
| 5,587,072 A * | 12/1996 | Regan | | B01D 29/54 |
| | | | | 405/36 |
| 5,863,425 A * | 1/1999 | Herlehy | | E04H 4/1654 |
| | | | | 285/308 |
| 5,887,299 A * | 3/1999 | Phillips | | A47G 9/086 |
| | | | | 5/413 R |
| 5,935,435 A * | 8/1999 | Hasler | | B01D 29/085 |
| | | | | 210/473 |
| 6,056,211 A * | 5/2000 | DiLoreto | | E03B 9/02 |
| | | | | 239/518 |
| 6,063,270 A * | 5/2000 | d'Offay | | E04H 4/1263 |
| | | | | 210/167.2 |
| 6,073,282 A * | 6/2000 | Leeper | | A47G 9/086 |
| | | | | 5/413 R |
| 6,098,813 A * | 8/2000 | Cini | | B01D 17/10 |
| | | | | 210/257.2 |
| 6,105,168 A * | 8/2000 | Hazen | | A47G 9/083 |
| | | | | 5/413 R |
| 6,210,573 B1 * | 4/2001 | Marshall | | B01D 29/27 |
| | | | | 210/462 |

(56) References Cited

U.S. PATENT DOCUMENTS

| | | | | |
|---|---|---|---|---|
| 6,241,899 B1* | 6/2001 | Ramos | B01D 39/163 | 210/167.17 |
| 6,253,585 B1* | 7/2001 | Wright | D06F 39/10 | 68/18 F |
| 6,312,598 B1* | 11/2001 | Munson | B01D 46/10 | 210/DIG. 8 |
| 6,334,953 B1* | 1/2002 | Singleton | B01D 29/27 | 405/36 |
| 6,338,173 B1* | 1/2002 | Ramsey | A47G 9/086 | 5/413 R |
| 6,358,405 B1* | 3/2002 | Leahy | E03F 5/14 | 210/170.03 |
| 6,371,307 B1* | 4/2002 | Eskes | B01D 39/2055 | 210/488 |
| 6,378,456 B1* | 4/2002 | Jerome | A01K 1/0353 | 5/413 R |
| 6,393,612 B1* | 5/2002 | Thach | A41B 13/065 | 2/69.5 |
| 6,436,286 B1* | 8/2002 | Scott | B05B 9/03 | 210/474 |
| 6,482,326 B2* | 11/2002 | Munson | B01D 46/10 | 210/DIG. 8 |
| 6,547,493 B2* | 4/2003 | Spangler | E02B 3/04 | 405/32 |
| 6,685,843 B2* | 2/2004 | Leaverton | B01D 29/27 | 210/485 |
| 6,740,233 B2* | 5/2004 | Stoltz | A47L 9/1427 | 210/232 |
| 6,797,164 B2* | 9/2004 | Leaverton | B01D 29/27 | 210/485 |
| 6,857,819 B2* | 2/2005 | Gunderson, III | B01D 17/0202 | 405/60 |
| 6,875,346 B2* | 4/2005 | Fox | B01D 29/96 | 210/493.1 |
| 6,875,350 B2* | 4/2005 | Allard | B01D 29/902 | 210/170.03 |
| 6,878,266 B2* | 4/2005 | Leaverton | C02F 1/004 | 220/495.11 |
| 6,908,550 B2* | 6/2005 | Silverstein | E04H 4/1636 | 210/232 |
| 6,939,463 B2* | 9/2005 | Leaverton | C02F 1/004 | 220/495.11 |
| 7,208,083 B2* | 4/2007 | Meritt-Powell | B01D 39/1623 | 264/DIG. 48 |
| 7,267,289 B2* | 9/2007 | Lyons | D06F 39/10 | 239/524 |
| 7,273,546 B2* | 9/2007 | Meritt-Powell | A47L 9/1427 | 210/167.17 |
| 7,354,512 B1* | 4/2008 | Barbe | B01D 29/27 | 210/232 |
| 7,454,847 B1* | 11/2008 | Miller | F26B 9/10 | 34/397 |
| 7,575,675 B2* | 8/2009 | Gopalan | B01D 29/23 | 210/232 |
| 7,581,259 B2* | 9/2009 | Thompson | A47G 9/066 | 2/69.5 |
| D630,295 S* | 1/2011 | Bechtold, Jr. | D23/209 | |
| 8,012,523 B2* | 9/2011 | Voss | A47J 31/0689 | 426/77 |
| 8,205,575 B2* | 6/2012 | Nicastle | A01K 7/00 | 119/72 |
| 8,221,620 B2* | 7/2012 | Dietrich | E04H 4/1636 | 210/232 |
| 8,221,813 B2* | 7/2012 | Boul | A47J 31/08 | 426/594 |
| D668,432 S* | 10/2012 | Lightle | D2/719 | |
| 9,010,656 B2* | 4/2015 | Cowin | E03B 7/09 | 137/15.05 |
| D728,198 S* | 5/2015 | Barski | D2/719 | |
| D764,864 S* | 8/2016 | Hertaus | D7/400 | |
| D764,865 S* | 8/2016 | Hertaus | D7/400 | |
| 9,587,410 B2* | 3/2017 | Gopalan | B01D 29/23 | |
| 9,700,846 B2* | 7/2017 | Clinch | B01D 63/081 | |
| 9,745,766 B2* | 8/2017 | Gopalan | B01D 29/27 | |
| 9,919,247 B2 | 3/2018 | Wettlaufer | | |
| 10,016,088 B2* | 7/2018 | Gross | A47J 31/446 | |
| 10,045,652 B2* | 8/2018 | Bodum | A47J 31/0636 | |
| 10,258,125 B1* | 4/2019 | Cohen | B32B 3/08 | |
| 10,426,137 B2* | 10/2019 | Thomas | A01K 7/005 | |
| 10,455,865 B2* | 10/2019 | Barski | A47G 9/083 | |
| 10,542,837 B2* | 1/2020 | Hsu | A47J 31/0626 | |
| 10,661,204 B2* | 5/2020 | Dobak | B01D 29/111 | |
| 10,743,557 B2 | 8/2020 | Hampton et al. | | |
| D953,801 S* | 6/2022 | Ong | D7/400 | |
| 11,554,333 B2* | 1/2023 | Farley | B01D 39/04 | |
| 11,578,778 B2* | 2/2023 | LaCrosse | A62C 37/50 | |
| 11,707,153 B2* | 7/2023 | Ewing | B30B 9/06 | 99/287 |
| 11,825,974 B1* | 11/2023 | Murphy | A47J 19/005 | |
| 2003/0094423 A1* | 5/2003 | Leaverton | B01D 29/27 | 210/167.12 |
| 2003/0106150 A1* | 6/2003 | Chyi | A47G 9/083 | 5/413 R |
| 2003/0136719 A1* | 7/2003 | Allard | B01D 37/025 | 210/209 |
| 2003/0205513 A1* | 11/2003 | Stoltz | B01D 29/27 | 210/167.17 |
| 2003/0205537 A1* | 11/2003 | Leaverton | C02F 1/004 | 210/767 |
| 2004/0104163 A1* | 6/2004 | Leaverton | C02F 1/00 | 210/237 |
| 2004/0107500 A1* | 6/2004 | Pigg | A47G 9/086 | 5/413 R |
| 2004/0112019 A1* | 6/2004 | Mountford | A47L 9/149 | 55/528 |
| 2004/0149666 A1* | 8/2004 | Leaverton | C02F 1/00 | 210/416.2 |
| 2004/0231608 A1* | 11/2004 | Grace-Kellogg | A01K 7/00 | 119/72 |
| 2004/0232058 A1* | 11/2004 | Silverstein | B01D 29/27 | 210/167.17 |
| 2004/0237192 A1* | 12/2004 | Holub | A47G 9/086 | 5/413 R |
| 2005/0029177 A1* | 2/2005 | Peterson | E04H 4/1654 | 210/167.17 |
| 2005/0040089 A1* | 2/2005 | Meritt-Powell | E04H 4/1654 | 210/167.17 |
| 2005/0210583 A1* | 9/2005 | Cook | A47D 15/02 | 5/413 R |
| 2005/0236310 A1* | 10/2005 | Meritt-Powell | B01D 29/111 | 210/167.17 |
| 2005/0279682 A1* | 12/2005 | Davidson | F16K 11/20 | 210/167.17 |
| 2007/0136946 A1* | 6/2007 | Haislip | A47G 9/086 | 5/413 R |
| 2007/0181477 A1* | 8/2007 | Anderson | E04H 4/1636 | 210/167.17 |
| 2007/0289906 A1* | 12/2007 | Gopalan | E04H 4/1654 | 210/242.1 |
| 2008/0035543 A1* | 2/2008 | Bloch | E04H 4/1654 | 210/167.1 |
| 2008/0222803 A1* | 9/2008 | Korshamn | A47G 9/083 | 5/413 R |
| 2008/0237153 A1* | 10/2008 | Nicastle | A01K 7/00 | 210/806 |
| 2009/0151071 A1* | 6/2009 | Martin | A47G 9/086 | 5/413 R |
| 2009/0169756 A1* | 7/2009 | Joosten | B44D 3/10 | 118/300 |
| 2009/0190865 A1* | 7/2009 | Chang | A45C 3/001 | 383/110 |
| 2009/0266767 A1* | 10/2009 | McInnis | E02B 3/108 | 210/170.03 |
| 2009/0301955 A1* | 12/2009 | Gopalan | E04H 4/1654 | 210/167.17 |
| 2010/0192298 A1* | 8/2010 | Michaelis | A47G 9/086 | 5/413 R |

(56) References Cited

U.S. PATENT DOCUMENTS

| | | | |
|---|---|---|---|
| 2010/0256716 A1* | 10/2010 | Haislip | A47G 9/086 5/413 R |
| 2010/0257654 A1* | 10/2010 | Waters | A41B 13/06 2/69.5 |
| 2011/0088136 A1* | 4/2011 | Isler | A41B 13/06 2/69 |
| 2011/0203980 A1* | 8/2011 | Dietrich | E04H 4/1636 210/167.17 |
| 2012/0255125 A1* | 10/2012 | Brown | A47G 9/08 5/413 R |
| 2014/0068834 A1* | 3/2014 | Skinner | A41B 13/06 2/69.5 |
| 2015/0183672 A1* | 7/2015 | Washburn | C02F 1/008 210/85 |
| 2016/0159662 A1* | 6/2016 | Clinch | B01D 63/021 210/324 |
| 2016/0227956 A1* | 8/2016 | Ko | A47J 31/10 |
| 2018/0008656 A1* | 1/2018 | Watts | B07B 1/24 |
| 2018/0071661 A1* | 3/2018 | Dobak | B01D 39/1623 |
| 2019/0083558 A1* | 3/2019 | Watts | B01D 46/30 |
| 2019/0376577 A1* | 12/2019 | LaCrosse | F16F 13/10 |
| 2021/0340046 A1* | 11/2021 | Afework | D03D 15/573 |
| 2021/0402331 A1* | 12/2021 | Farley | C02F 1/001 |
| 2022/0265081 A1* | 8/2022 | Ewing | A47J 31/0636 |
| 2023/0147788 A1* | 5/2023 | LaCrosse | B01D 35/02 383/105 |
| 2023/0311066 A1* | 10/2023 | Brown | B01D 36/02 210/257.2 |
| 2023/0390674 A1* | 12/2023 | Ewing | B01D 29/62 |

OTHER PUBLICATIONS

Non-Final Office Action, dated Oct. 14, 2022, for U.S. Appl. No. 17/832,501, filed Jun. 3, 2022, 14 pages.

* cited by examiner

LIQUID FILTERING BAG

BACKGROUND OF THE INVENTION

The liquid filtering bag is an important device used in the preparation of many beverages such as cold-brewed coffee, nut milk, and juice. A liquid filtering bag is also an important device used in the preparation of infused oils. Reusable liquid filtering bags are typically manufactured from fabrics that allow them to be washed and reused many times.

Those skilled in the art find that currently available reusable liquid filtering bags suffer from limitations related to gradual fouling and clogging and consequent loss of efficacy. During the filtering process, solid particles, fats and waxes become lodged inside the meshwork of the filtering bag. As the meshwork accumulates debris, the effective size of the pores decreases, resistance to flow increases, and the filtering performance of the filtering bag degrades.

There are various ways to wash a reusable filtering bag to remove embedded debris and restore filter performance. Handwashing can partially restore filter performance, though handwashing is labor intensive, requires manual turning inside-out, exposes the operator to skin-irritating detergents, and requires multiple cycles of washing and rinsing. After handwashing the filtering bag, subsequent machine washing can further remove embedded debris, but machine washing typically fails to fully restore the performance of the filtering bag. As a result, those skilled in the art find that currently available reusable liquid filtering bags require significantly labor-intensive handwashing prior to machine washing and yet tend to steadily lose performance after every interval of filtering and washing and that after some number of intervals they need to be discarded.

In U.S. Pat. No. 9,919,247, Wettlaufer describes a seamless filter bag for a juice press. The open-top bag is formed by folding a single continuous sheet of fabric in half, then crimping the right and left sides with folds that are held in place with one or more belts. When said bag is unfolded, the single continuous sheet of fabric would be suitable for machine laundering. However, in operation, said bag is squeezed between two platens with up to seven tons of force which requires a large and expensive press that may only be suitable for a factory or store distributing bottled juice.

In U.S. Pat. No. 6,908,550, Silverstein describes a filter bag for a pool cleaning device with a zipper opening along one side. The zipper opening allows for temporary access to the interior of the bag to remove collected debris. Based on the described embodiments of the invention, it is anticipated that said bag would not be suitable for machine laundering.

In U.S. Pat. No. 10,743,557, Hampton et. al. describe a nutmilk extraction device utilizing an open-top filtering bag that is suspended inside an extraction chamber. The bag is twistably compressed by a twistable cap on the device. Based on the described embodiments of the invention, it is anticipated that said bag would not be suitable for machine laundering.

Despite the available art described in the patents, there remains a large unmet need for reusable liquid filtering bags that can conveniently process infused oils and beverages such as cold-brew coffee, nut milks, and juices and that can be more easily cleaned and more fully restored to their original filtering performance after every washing. There is also a large unmet need in commercial kitchens and restaurants for filtering bags that can be conveniently washed in a laundry machine and reused in a way that meets stringent sanitation regulations. Such a reusable filtering bag would help support and promote the current consumer demand for healthier, cold-brewed beverage and nut milk options.

SUMMARY OF THE INVENTION

The present invention describes a reusable liquid filtering bag that can be disassembled to form a single continuous sheet of fabric and laundered in an automatic laundry washing machine. Said bag employs a continuous zipper along the bottom and side edge. When said zipper is fully engaged, the bottom and side edge of said bag are sealed to form an open-top filtering bag. When said zipper is fully disengaged, said edges are released and said bag opens to form a single continuous flat sheet of fabric.

It has been discovered that common zippers can be readily incorporated into embodiments of the invention without compromising filtering performance. For context, someone of ordinary skill in the art would likely anticipate the gap between opposing teeth of common zippers would permit filtered particulates to escape the filtering bag and degrade filtering performance. However, common zippers have been discovered to have such closely engaged opposing teeth that they not only block the escape of particulates, they also sustain this performance under elevated pressures induced by filtering presses.

It has also been discovered that laundering the bag in its unzipped, disassembled form facilitates sufficient removal of embedded debris that filtering performance is fully restored after laundering. For context, someone of ordinary skill in the art would likely anticipate that laundering the unzipped, disassembled filter would provide an incremental benefit in restoring filtering performance after laundering. Quite unexpectedly, embodiments of the invention appear to retain nearly complete filtering performance after many cycles of filtering and washing while conventional filtering bags made from the identical fabric lose significant filtering performance after a single cycle of filtering and washing.

In some embodiments of the present invention, filtering bags may be tall and narrow or may be short and wide. Embodiments may have a bottom zipper-fringed edge that is straight or rounded.

A deeper understanding of the nature and advantages of the present invention may be achieved by referring to the drawings and the remainder of the specification.

SPECIFICATIONS

Figure 1:
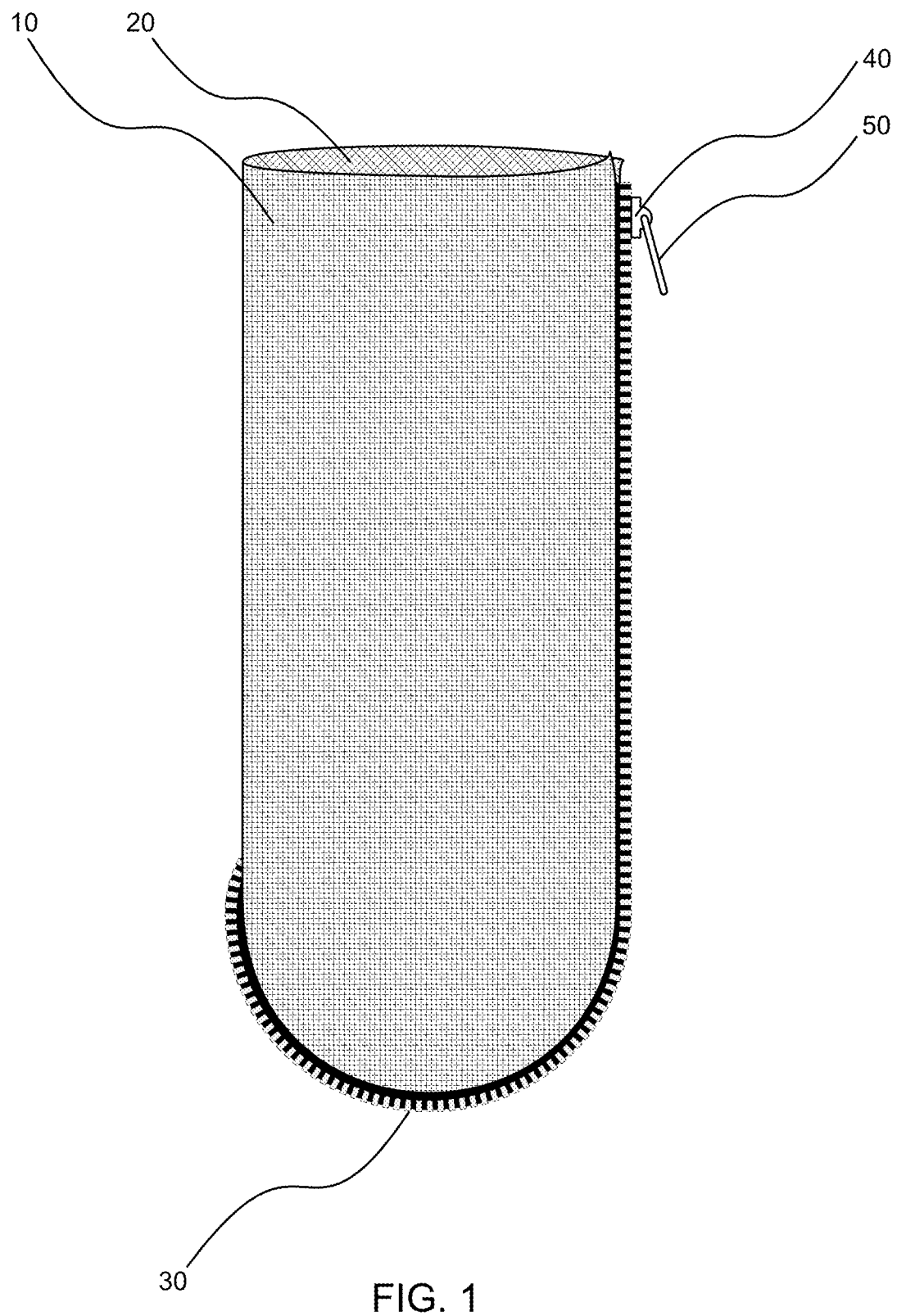
FIG. 1 shows a tall and narrow liquid filtering bag in an assembled open-top bag configuration with the zipper fully engaged. Said configuration represents the state during which said bag can be used to filter liquids.

FIG. 1 shows a tall and narrow liquid filtering bag according to a preferred embodiment of the invention. Said bag is shown in an assembled open-top bag configuration representing the state during which said bag can be used to filter liquids. An outer surface 10 of said filtering bag exudes filtered liquid during filtering operation. An inner surface 20 of said bag receives unfiltered liquid and traps filtered particulates during filtering operation. A fully engaged zipper 30 forms the bottom and side edge of said filtering bag. A zipper slider 40 and puller 50 are configured to rest at the top edge of said bag when fully engaged.

In embodiments of the invention, the filter bag is made from mesh, fabric, non-woven fabric, fiber, cloth, cotton, nylon, polyester, or cotton paper. Said embodiments are fashioned with a mesh spacing selected from about 25-500 micrometers and preferably 70-150 micrometers. Said embodiments are configured with an open top further configured with one or more closure devices selected from the group comprising crimp, fold, flap, clamp, drawstring, zipper, and hook-and-loop fastener.

In embodiments of the invention, the zipper 30 may be selected from gauge sizes #3 up to #10. It was discovered that said zipper selected from these gauge sizes was sufficiently tightly engaged to prevent the escape of filtered particulates from between its teeth out of the bag into the filtered liquid.

In embodiments of the invention, tall and narrow filtering bags would be selected from sizes that can conveniently process about 200-10000 milliliters of unfiltered liquid and preferably 500-2000 milliliters of unfiltered liquid. Said embodiments have a height of about 200-900 millimeters and preferably 300-500 millimeters. Said embodiments have a width of about 100-500 millimeters and preferably 150-250 millimeters. Said embodiments have a height to width ratio of about 1.5 to 3 and preferably around 2.

It was discovered that when reduced to practice, a tall and narrow liquid filtering bag is ideally suited for many food and beverage filtering tasks when it is supported by a tall and narrow supporting pitcher common to most kitchens because the bag is less sufficiently stable to staying upright on its own during filling.

Figure 2:
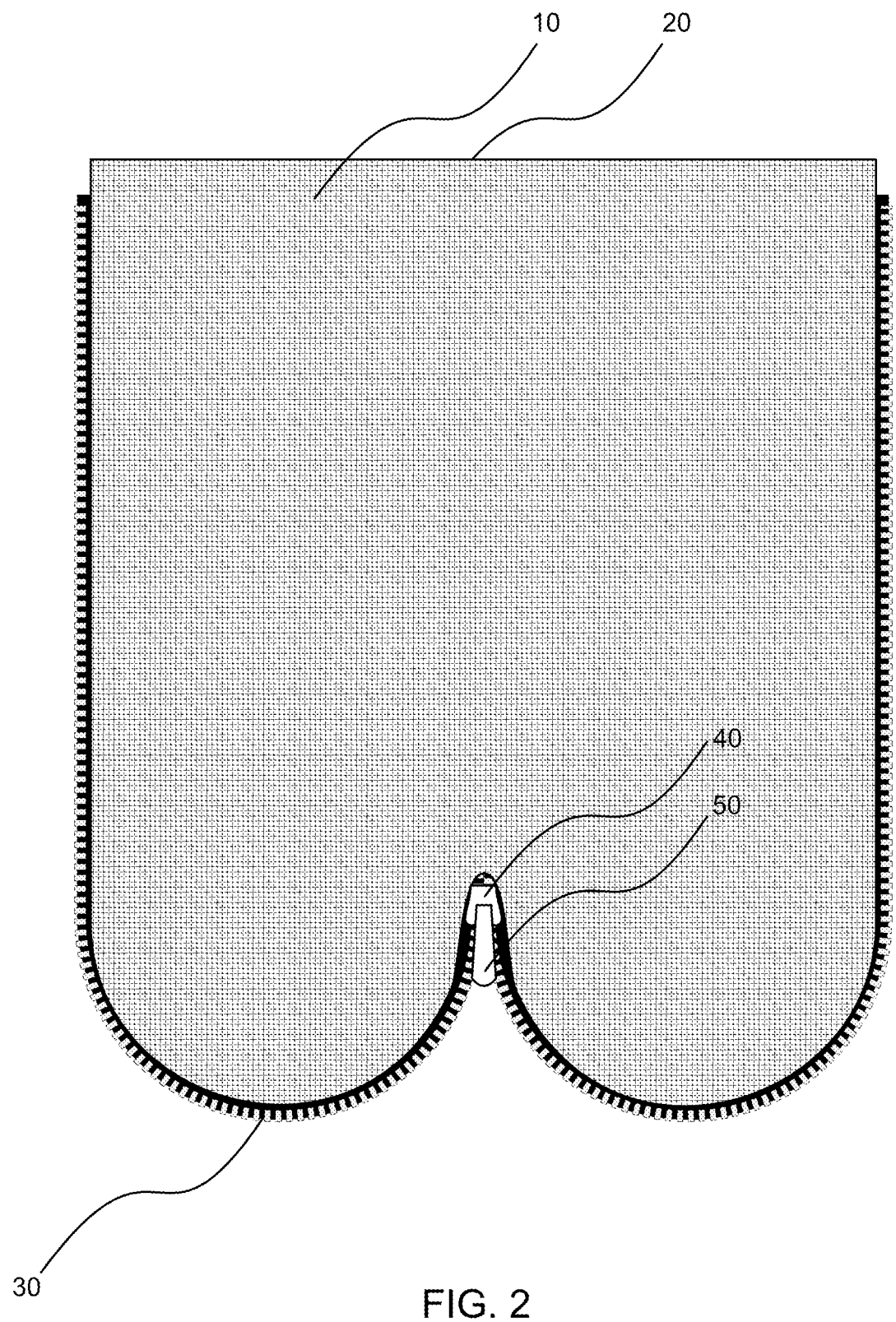
FIG. 2 shows a tall and narrow liquid filtering bag in a disassembled flat-sheet configuration with the zipper fully disengaged. Said configuration represents the state during which said bag can be washed, dried, and stored.

FIG. 2 shows a tall and narrow liquid filtering bag in a disassembled, flat-sheet configuration according to a preferred embodiment of the invention. The flat-sheet configuration represents the state during which said bag can be washed, dried, and stored. A visible, formerly outer surface 10 and hidden, formerly inner surface 20 are fully exposed to laundering agents and washing water during automatic machine washing. The fully exposed surfaces facilitate the unhindered release of trapped debris from said surface 20 directly into the bulk phase of washing water. A fully disengaged zipper 30 forms the bottom edge and both side edges of said disassembled filtering bag. A zipper slider 40 and puller 50 are configured to rest at the innermost center of bottom edge of said bag where the two opposing zipper edges remain connected when fully disengaged.

In preferred embodiments of the invention, disassembled filtering bags would be washable in an automatic washing machine without the need for extensive hand pre-washing. Said filtering bags would also be compatible with high-temperature washing, disinfection, and high-temperature drying in order to ensure proper sanitation for reuse in a commercial food establishment.

In embodiments of the invention, the disassembled, flat-sheet configurations of tall and narrow filtering bags have height of about 200-900 millimeters and preferably 300-500 millimeters. Said embodiments have a width of about 200-900 millimeters and preferably 300-500 millimeters. Said embodiments have a height to width ratio of around 0.75 to 1.5 and preferably around 1.

It was discovered that laundering the disassembled, flat-sheet configuration of filtering bags was far more effective than laundering of a conventional filtering bag; nearly all the original filtering performance of the filtering bag could be retained after every cycle of filtering, washing, and drying. The superior filtration performance of embodiments of the invention after washing has enabled their use with more challenging filtration tasks involving finer particulates, which, in turn, has enabled the development of unprecedented new techniques of cold brew beverage production involving much finer grinding and better flavor extraction from brewing materials than previously anticipated.

Figure 3:
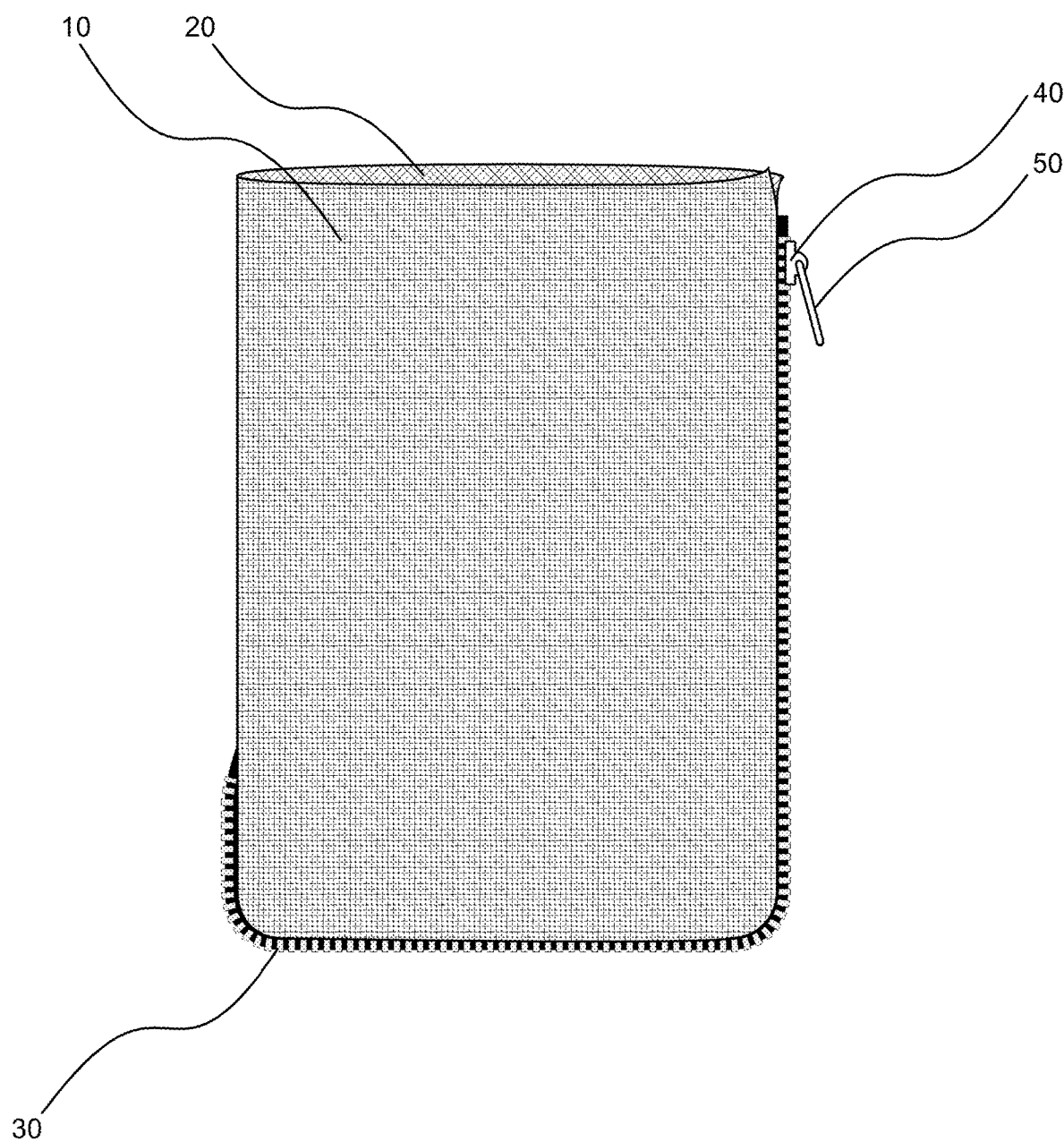
FIG. 3 shows a short and wide liquid filtering bag in an assembled open-top bag configuration with the zipper fully engaged. Said configuration represents the state during which said bag can be used to filter liquids.

FIG. 3 shows a short and wide liquid filtering bag according to a preferred embodiment of the invention. Said bag is shown in fully assembled configuration representing the state during which said bag can be used to filter liquids. An outer surface 10 of said filtering bag exudes filtered liquid during filtering operation. An inner surface 20 of said bag receives unfiltered liquid and collects filtered particulates during filtering operation. A fully engaged zipper 30 forms bottom and side edge of said filtering bag. A zipper slider 40 and puller 50 are configured to rest at the top edge of said bag when fully engaged.

In embodiments of the invention, short and wide filtering bags would be selected from sizes that can conveniently process about 200-10000 milliliters of unfiltered liquid and preferably 500-2000 milliliters of unfiltered liquid. Said embodiments have a height of about 150-700 millimeters and preferably 200-400 millimeters. Said embodiments have a width of about 150-700 millimeters and preferably 200-400 millimeters. Said embodiments have a height to width ratio of about 0.75 to 1.5 and preferably around 1.

It was discovered that when reduced to practice, a short and wide liquid filtering bag is ideally suited for many food and beverage filtering tasks when it is supported by a flat pan or shallow pot common to most kitchens because the bag is more sufficiently stable to staying upright on its own during filling.

Figure 4:
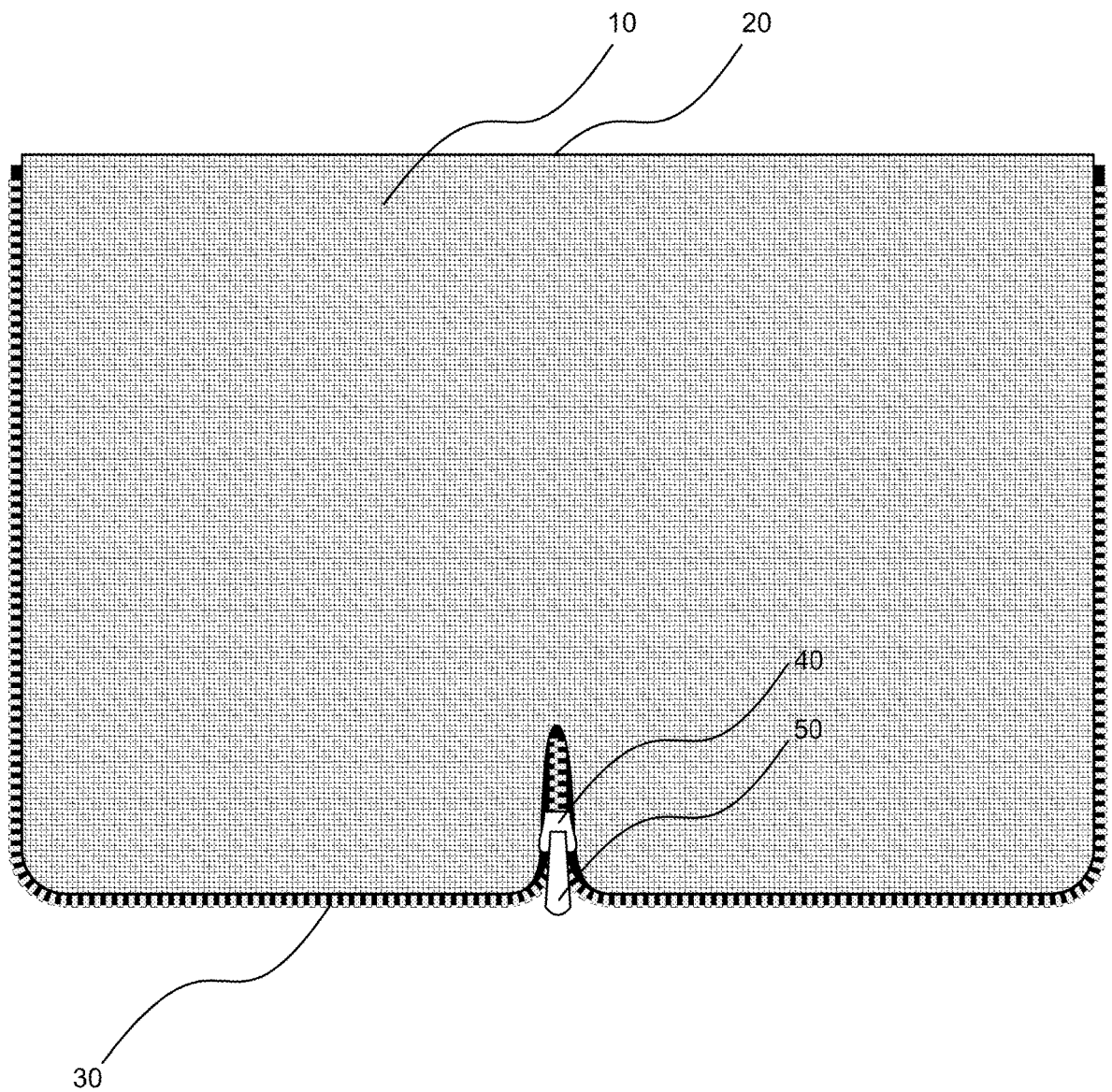
FIG. 4 shows a short and wide liquid filtering bag in a disassembled flat-sheet configuration with the zipper fully disengaged. Said configuration represents the state during which said bag can be washed, dried, and stored.

FIG. 4 shows a short and wide liquid filtering bag in a fully disassembled configuration representing the state during which said bag can be washed, dried, and stored. A visible, formerly outer surface 10 and hidden, formerly inner surface 20 are fully exposed to laundering agents and washing water during automatic machine washing enabling the complete release of trapped debris from said surface 20. A fully disengaged zipper 30 forms the bottom and both side edges of said disassembled filtering bag. A zipper slider 40 and puller 50 are configured to rest at the innermost center of bottom edge of said bag where the two opposing zipper edges remain connected when fully disengaged.

In embodiments of the invention, short and wide filtering bags in a fully disassembled configuration have a height of about 150-700 millimeters and preferably 200-400 millimeters. Said embodiments have a width of about 300-1300 millimeters and preferably 500-700 millimeters. Said embodiments have a height to width ratio of about 0.25 to 0.75 and preferably around 0.5.

While the above text and accompanying figures are a complete description of specific embodiments of the invention, they should not be taken as limiting the scope of the invention as defined by the claims. For instance, the filtering bags described by this invention could be implemented for the separation of any solid and liquid mixture that may or may not be beverage or aqueous. The filtering bags could be implemented to operate at any given temperature and pressure.

What is claimed is:

1. A liquid filter bag comprising:
    an opening; and
    a body portion comprising a first side disposed opposite a second side and a bottom portion disposed opposite a top portion, wherein the body portion comprises:
    a single unitary sheet comprising a liquid-permeable fabric; and
    a zipper disposed on a portion of a perimeter of the body portion, wherein:
    a height from a lower edge of a bottom portion to an upper edge of the opening proximate the top portion that is in a range of 150 to 700 millimeters,
    a width from the first side to the second side that is in a range of 150-700 millimeters, and
    a height to width ratio in a range of 0.75 to 1.5;
    wherein, when an unfiltered liquid is received in the body portion, the liquid-permeable fabric of the body portion retains particulates of the unfiltered liquid, and
    wherein disengaging the zipper forms the liquid filter bag into a flat configuration that is machine-washable to remove debris from the liquid-permeable fabric.

2. The liquid filter bag of claim 1, wherein the washed flat configuration of the liquid filter bag is dryable and storable.

3. The liquid filter bag of claim 1, wherein:
    the height is in the range of 200 to 400 millimeters;
    the width is in the range of 200 to 400 millimeters; and
    the height to width ratio is about 1.

4. The liquid filter bag of claim 1, wherein:
    the height is in the range of 200 to 400 millimeters; and
    the width is in the range of 500 to 700 millimeters.

* * * * *